(12) United States Patent
Boucard et al.

(10) Patent No.: US 11,940,939 B2
(45) Date of Patent: Mar. 26, 2024

(54) ENCODING BYTE INFORMATION ON A DATA BUS WITH SEPARATE CODE

(71) Applicant: QUALCOMM INCORPORATED, San Diego, CA (US)

(72) Inventors: Philippe Boucard, Le Chesnay (FR); Christophe Layer, Paris (FR); Luc Montperrus, Montigny le Bretonneux (FR)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 17/688,607

(22) Filed: Mar. 7, 2022

(65) Prior Publication Data

US 2023/0281143 A1 Sep. 7, 2023

(51) Int. Cl.
*G06F 13/40* (2006.01)
*G06F 13/42* (2006.01)
*G06F 15/78* (2006.01)

(52) U.S. Cl.
CPC ...... *G06F 13/4018* (2013.01); *G06F 13/4059* (2013.01); *G06F 13/4282* (2013.01); *G06F 15/7807* (2013.01)

(58) Field of Classification Search
CPC ............ G06F 13/4018; G06F 13/4059; G06F 13/4282; G06F 15/7807
USPC ................ 710/20, 30, 33, 307, 313
See application file for complete search history.

(56) References Cited

U.S. PATENT DOCUMENTS

| | | | |
|---|---|---|---|
| 5,812,803 A * | 9/1998 | Pawlowski | G06F 13/1684 710/305 |
| 5,983,300 A | 11/1999 | Kanekal | |
| 7,937,495 B2 | 5/2011 | Marshall et al. | |
| 8,886,055 B1 * | 11/2014 | Morero | H04L 1/0045 398/208 |
| 8,908,773 B2 * | 12/2014 | Citta | H04N 21/64315 375/240.26 |
| 10,558,602 B1 * | 2/2020 | Diamand | G06F 13/1673 |
| 2002/0052989 A1 | 5/2002 | Yamamoto et al. | |

(Continued)

FOREIGN PATENT DOCUMENTS

KR  10-0660829 B1  12/2006

OTHER PUBLICATIONS

Corresponding/Related PCT App. Ser. No. PCT/US2023/062719, filed on Feb. 16, 2023, International Search Report & Written Opinion rendered by ISA/EP dated Jun. 7, 2023, eight pages.

*Primary Examiner* — Farley Abad
*Assistant Examiner* — Henry W Yu
(74) *Attorney, Agent, or Firm* — Smith Tempel Blaha LLC/Qualcomm

(57) ABSTRACT

Data may be communicated from a sender device to a receiver device over enabled or selected byte positions or other data bit groups of a data bus. The sender device may determine data values to be sent over the data bus and may determine which byte positions are enabled or selected and which are not selected. The sender device may also determine a code. The code may be a value that is not included in the data values to be sent over the data bus. The sender device may then send the selected data values in selected byte positions of the data bus and send the code in non-selected byte positions of the data bus. The sender device may also send the code to the receiver device separately from the data bit lanes of the data bus.

22 Claims, 9 Drawing Sheets

(56) References Cited

U.S. PATENT DOCUMENTS

| | | | |
|---|---|---|---|
| 2002/0144085 A1* | 10/2002 | Hiratsuka | G06F 13/4018 712/27 |
| 2006/0133406 A1* | 6/2006 | Homer | H04L 47/50 370/442 |
| 2007/0025382 A1* | 2/2007 | Jones | H04L 12/40019 370/431 |
| 2008/0320202 A1* | 12/2008 | Monks | G06F 13/426 710/313 |
| 2010/0095186 A1* | 4/2010 | Weingarten | H03M 13/151 714/763 |
| 2019/0004797 A1* | 1/2019 | Zbiciak | G06F 9/3013 |

* cited by examiner

ENCODING BYTE INFORMATION ON A DATA BUS WITH SEPARATE CODE

DESCRIPTION OF THE RELATED ART

A computing device may include multiple subsystems, cores or other components. Such a computing device may be, for example, a portable computing device ("PCD"), such as a laptop or palmtop computer, a cellular telephone or smartphone, portable digital assistant, portable game console, etc.

The multiple subsystems, cores or other components of a computing device may be included within the same integrated circuit chip or in different chips. A "system-on-a-chip" or "SoC" is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other processing subsystems, such as a transceiver or "modem" subsystem that provides wireless connectivity, a memory subsystem, etc.

The various subsystems may communicate with one another via data buses. A data bus may be serial or parallel. A parallel data bus comprises multiple signal lines, also referred to as bits, lanes, etc. The number of data bus lanes may be referred to as the data bus width. A memory bus is a common example of a parallel data bus. While a wider data bus may help increase bandwidth, some disadvantages of a wider data bus may include more chip area occupied by data bus lanes, increased power consumption, narrower timing margins, etc.

Some types of memory devices may be configured into different data widths, depending upon the application or data requirements. A feature of some systems having memory that is configurable into different data widths is the ability to selectively write to only a portion or subset of the widest data width. A technique known as "byte enable" allows selected bytes to be written to within a wider data-width block. For example, in the case of a 32-bit width (i.e., four bytes) only the lowest byte may be selected to be written to instead of the entire four bytes. Byte-enable ("BE") bits may be communicated from a sending subsystem to a receiving subsystem along with the corresponding data bytes. The sending device (e.g., a processor) may selectively send data on all bytes of the data bus or only a subset. The sending device may use the BE bits to indicate the selected or enabled byte positions on the data bus. Based on the BE bits, the receiving device may process only data received in enabled byte positions on the data bus and ignore (i.e., not process) data received in non-enabled byte positions on the data bus. For example, a memory may write only the data bytes that the BE bits indicate are enabled.

In a data bus scheme in which one BE bit is included for each data byte, the wider the data bus in bytes, the greater the number of lanes reserved for BE bits rather than for data. It would be desirable to provide a BE feature that increases efficient use of lanes for data.

SUMMARY OF THE DISCLOSURE

Systems, methods, computer-readable media, and other examples are disclosed for communicating data from a sender device to a receiver device over a data bus using selected byte positions or other data bit groups.

An exemplary method for data communication over a data bus may be provided. The data bus may have a plurality of data bit groups. Each data bit group may have a plurality of data bit lanes. The method may include determining, by a sender device, a set of selected data values to be sent over the data bus. The method may also include determining, by the sender device, selected and non-selected data bit groups. The method may further include determining, by the sender device, a code representing a non-selected data value not included in the set of selected data values. The method may still further include sending to a receiver device over the data bit lanes selected data values in selected data bit groups and the code in non-selected data bit groups. The method may yet further include sending the code to the receiver device separately from the data bit lanes.

An exemplary system for data communication over a data bus may be provided. The data bus may have a plurality of data bit groups. Each data bit group may have a plurality of data bit lanes. The exemplary system may include an encoder and a data word formatter. The encoder may be configured to determine a set of selected data values to be sent over the data bus. The data word formatter may be configured to determine selected and non-selected data bit groups. The data word formatter may also be configured to determine a code representing a non-selected data value not included in the set of selected data values. The data word formatter may further be configured to provide to a receiver device over the data bit lanes a data word having the selected data values in selected data bit groups and the code in non-selected data bit groups. The data word formatter may still further be configured to provide the code to the receiver device over a plurality of code bit lanes that are separate from the data bit lanes.

Another exemplary system for data communication over a data bus may be provided. The data bus may have a plurality of data bit groups. Each data bit group may have a plurality of data bit lanes. The system may include means for determining a set of selected data values to be sent over the data bus. The system may also include means for determining selected and non-selected data bit groups. The system may further include means for determining a code representing a non-selected data value not included in the set of selected data values. The system may still further include means for sending to a receiver device over the data bit lanes selected data values in selected data bit groups and the code in non-selected data bit groups. The system may yet further include means for sending the code to the receiver device separately from the data bit lanes.

An exemplary computer-readable medium for data communication over a data bus may be provided. The data bus may have a plurality of data bit groups. Each data bit group may have a plurality of data bit lanes. The computer-readable medium may comprise a non-transitory computer-readable medium having instructions stored thereon in computer-executable form. The instructions, when executed by a processing system of a computing device, may configure the processing system to control the following. The instructions may configure the processing system to control determining a set of selected data values to be sent over the data bus. The instructions may also configure the processing system to control determining selected and non-selected data bit groups. The instructions may further configure the processing system to control determining a code representing a non-selected data value not included in the set of selected data values. The instructions may still further configure the processing system to control sending to a receiver device over the data bit lanes selected data values in selected data bit groups and the code in non-selected data bit groups. The instructions may yet further configure the processing system to control sending the code to the receiver device separately from the data bit lanes.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
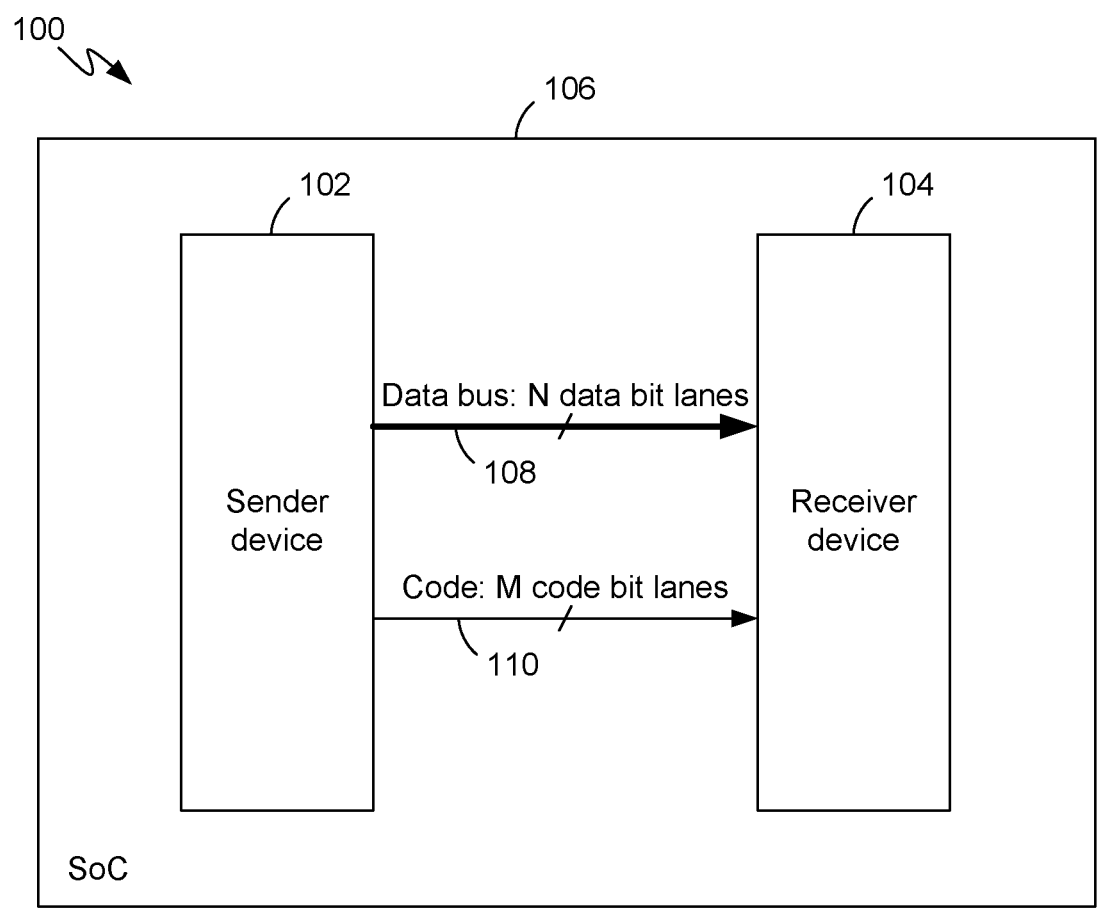
FIG. 1 is a block diagram illustrating a system for communicating data between a sender device and a receiver device over a data bus, in accordance with exemplary embodiments.

As shown in FIG. 1, a system 100 may include a sender device 102 and a receiver device 104. The sender device 102 and receiver device 104 may be included on a system-on-a-chip or "SoC" 106. That is, the sender device 102 and receiver device 104 each may comprise electronic circuitry on the SoC 106. In an example, the sender device 102 may comprise a processor or processing circuitry, and the receiver device 104 may comprise a memory device having a configurable data width. Although in this exemplary embodiment the sender device 102 and receiver device 104 are on the same SoC 106 as each other, in other embodiments such a sender device and receiver device may be on separate chips. For example, a sender device and receiver device may be on separate "chiplets" in a package.

A data bus 108 comprising a number ("N") of data bit lanes may interconnect the sender device 102 and receiver device 104. Each data bit lane may be an electrical signal conductor or path, such as a metallized strip on the SoC 106. The data bus 108 may communicate N bits of information or data in parallel, each data bit lane communicating one bit of data. The data bus 108 may have a width expressed in bits, bytes or any other units. For purposes of the present disclosure, the width of the data bus 108 may be expressed in units referred to as "data bit groups," each data bit group comprising two or more data bit lanes. In an example, each data bit group may consist of eight data bit lanes, i.e., one byte, and the data bus 108 may have a width of 256 bytes, communicated over a total of N=2048 lanes (i.e., 256 bytes×8 lanes per byte).

Although in this example each data bit group comprises eight bits (i.e., one byte), in other examples each data bit group may comprise any number of two or more bits. Although the terms "sender" and "receiver" are used for purposes of illustrating an example, and an exemplary direction of data communication is indicated by the arrowhead on the data bus 108 in FIG. 1, it should be understood that the data bus 108 may be bidirectional in other examples. Also, the term "data bus" is used for convenience and should not be construed as limiting. For example, the data bus 108 may be a complex data interconnect, such as a type of data interconnect sometimes referred to as a network-on-a-chip or "NoC," interconnect "fabric," etc. Although not shown in FIG. 1, a data bus in accordance with the present disclosure may interconnect any number of different devices. Any such device that sends data to another such device over a data bus may be a "sender" device as the term is used herein. Likewise, any such device that receives data from another such device over a data bus may be a "receiver" device as the term is used herein. As some devices may be bidirectional (i.e., transceivers) in some examples, a sender device may be a bidirectional device that is configured in a mode to send data, while a receiver device may be a bidirectional device that is configured in a mode to receive data.

In addition, a number ("M") of code bit lanes 110 may interconnect the sender device 102 and receiver device 104. Like the above-described data bit lanes of the data bus 108, each code bit lane may be an electrical signal conductor or path, such as a metallized strip on the SoC 106. The code bit lanes 110 may communicate a code, comprising M parallel code bits, from the sender device 102 to the receiver device 104. The code may be the same data size as each data bit group. In an example in which each data bit group consists of eight data bit lanes, the code may comprise eight bits (i.e., M=8 code bit lanes 110). Nevertheless, in other examples the code may comprise any other number of bits that is not inconsistent with the principles of operation described below. The code bit lanes 110 may be part of the same interconnect structure as the data bus 108, but the code bit lanes 110 and data bus 108 are depicted separately in FIG. 1 for purposes of clarity. Note that in the example shown in in FIG. 1 at least N+M lanes interconnect or couple the sender device 102 and receiver device 104.

Figure 2:
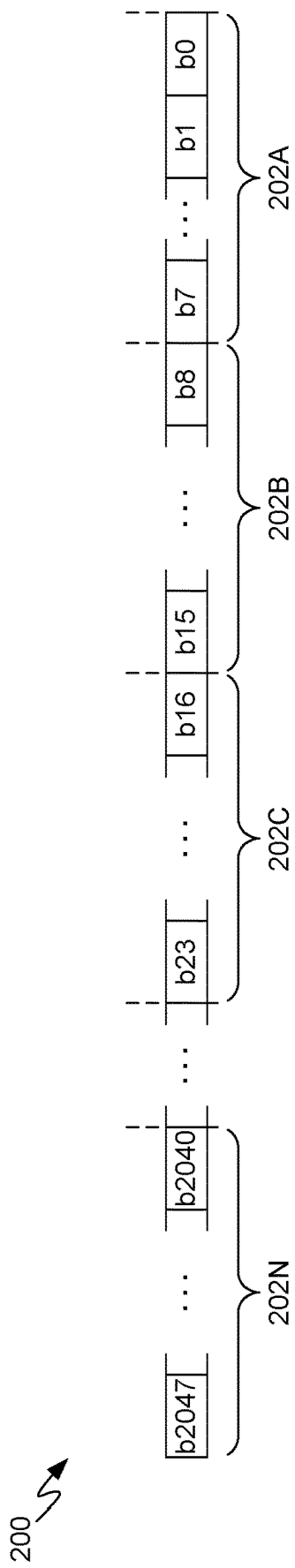
FIG. 2 is a data diagram illustrating an exemplary data word configuration with which the system of FIG. 1 may operate, in accordance with exemplary embodiments.

As shown in FIG. 2, an exemplary data word configuration 200 may consist of 256 bytes, which correspondingly may be communicated by the data bus 108 (FIG. 1) having N=2048 lanes (i.e., 256 bytes×8 lanes per byte). In the illustrated data word configuration 200, byte positions are examples of the above-described data bit groups of the data bus 108 (FIG. 1). Accordingly, in the example illustrated in FIG. 2 the data word configuration 200 consists of: a first byte position 202A (e.g., in the least-significant byte position); a second byte position 202B adjacent the first byte position 202A; a third byte position 202C adjacent the second byte position 202B, etc., through a 256th byte position 202N (e.g., in the most-significant byte position). In the illustrated example: the first byte position 202A may contain a first bit b0 of the data word, a second bit b1 of the data word, a third bit b2 of the data word, etc., through an 8th bit b7 of the data word; the second byte position 202B may contain a 9th bit b8 of the data word through a 16th bit b15 of the data word; the third byte position 202C may contain a 17th bit b16 of the data word through an 24th bit b23 of the data word; etc., through the 256th byte position 202N, which may contain a 2041st bit b2040 of the data word through a 2048th bit b2047 of the data word.

Figure 3:
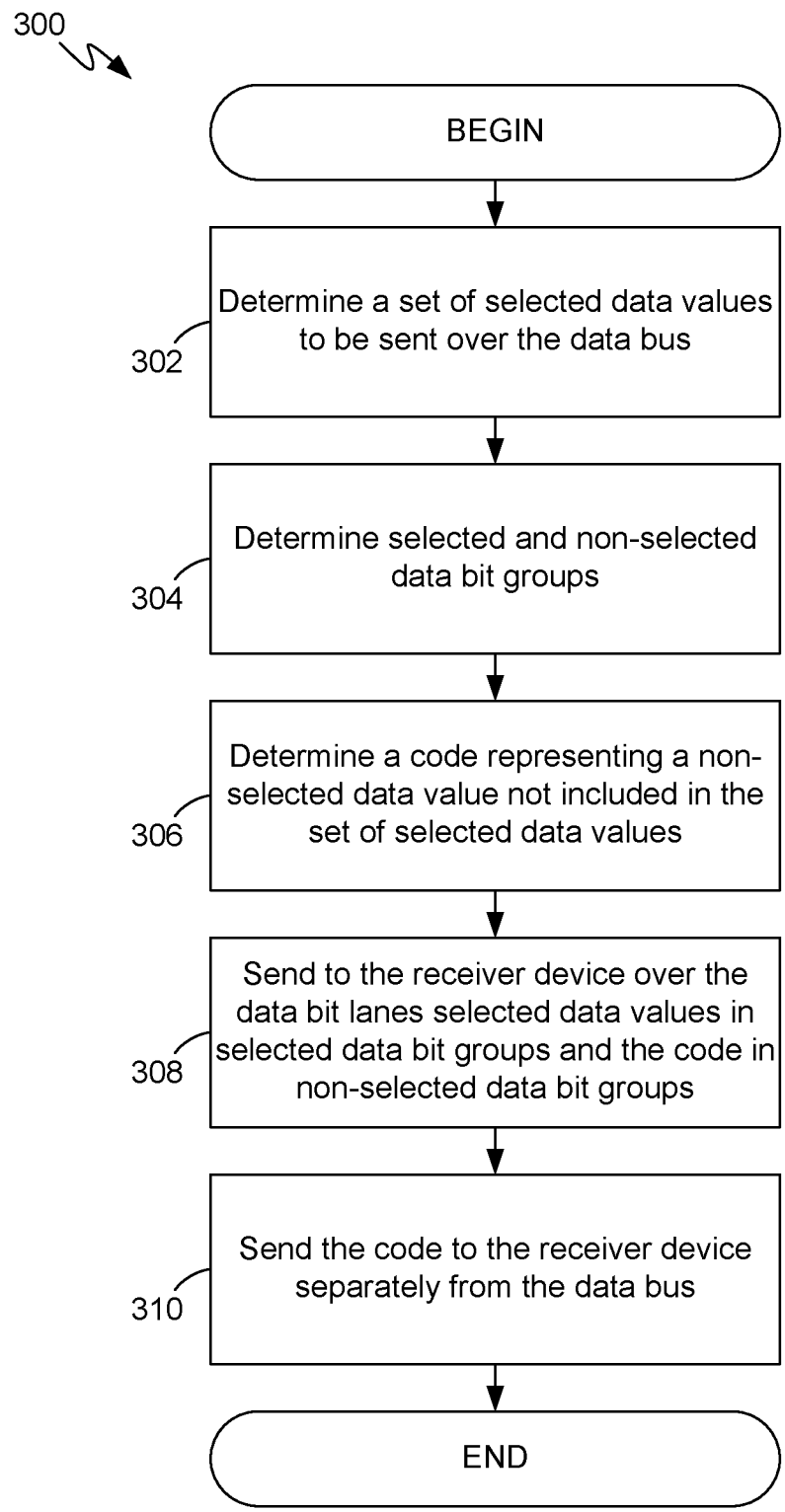
FIG. 3 is a flow diagram illustrating an exemplary method for communicating data between a sender device and a receiver device over a data bus, in accordance with exemplary embodiments.

In FIG. 3, a method 300 for communicating data over a data bus is illustrated. The data bus may be configured as described above with regard to FIGS. 1-2. That is, the data bus may comprise two or more data bit groups, such as two or more bytes, where each data bit group comprises two or more data bit lanes. A sender device may be configured to control some or all of the method 300. For example, in an embodiment in which the sender device includes a processor, the processor may be configured by software or firmware to control some or all of the method 300. Also, the sender device or a portion thereof (e.g., a processor) may be an example of means for performing the functions set forth in the method 300. The method 300 may include the following features, functions, acts, etc., indicated in blocks 302-310, which may be performed or otherwise occur in any order not inconsistent with the descriptions herein. The blocks 302-310 are described in an order conducive to understanding the exemplary method 300, but methods for communicating data from a sender device to a receiver device over a data bus are not limited to that order.

As indicated by block 302, the method 300 may include determining a set of data values (i.e., selected data values) to be sent over the data bus. For example, the sender device may obtain data from another source and arrange or organize data values to send to the receiver device. In some examples, data values to be sent to the receiver device may be the results of computations performed by the sender device. Referring again to the example shown in FIG. 2, each data value may be one byte, i.e., eight bits. In such an example, a data value may be in a range from zero to 255. In some examples, the size of the set of selected data values may be related to the size of a data word. For example, up to 256 one-byte data values may be selected to be sent over the data bus. In such an example the sender device may determine or provide the set of selected data values to be sent in the form of one 256-byte data word. In such an example the method 300 may be repeated any number of times to send any number of data words.

As indicated by block 304, the method 300 may further include determining selected and non-selected data bit groups. For example, the sender device may select in which of the data bit groups to send the selected data values and, conversely, in which of the data bit groups not to send any selected data values. The sender device may select any or all of the data bit groups to collectively send the set of selected data values. Referring again to the example shown in FIG. 2, the sender device may select any of the byte positions 202A-202N to contain data in the transferring or sending operation from the sender device to the receiver device. The selected data bit groups (e.g., byte positions) may also be referred to as enabled data bit groups. In an example in which data bit groups are byte positions, the selected byte positions may also be referred to as enabled byte positions or enabled bytes. As described below, in some examples of the method 300 a sender device may generate a data structure, such as an array or vector of bits, which may indicate which data bit groups are selected (or enabled) and which data bit groups are not selected.

As indicated by block 306, the method 300 may yet further include determining a code representing a non-selected data value. The code or non-selected data value may be any data value that is not included in the set of selected data values.

As indicated by block 308, the method 300 may still further include sending to the receiver device over the data bit lanes selected data values in the selected data bit groups and the code in the non-selected data bit groups. In other words, in the data word that is sent, selected data values are positioned or contained in the selected data bit groups, and the code is positioned or contained in the non-selected data bit groups. As indicated by block 310, the method 300 may also include sending the code to the receiver device separately from the data bit lanes. For example, referring again to FIG. 1, the sender device 102 may send the code to the receiver device over the code bit lanes 110.

Figure 4:
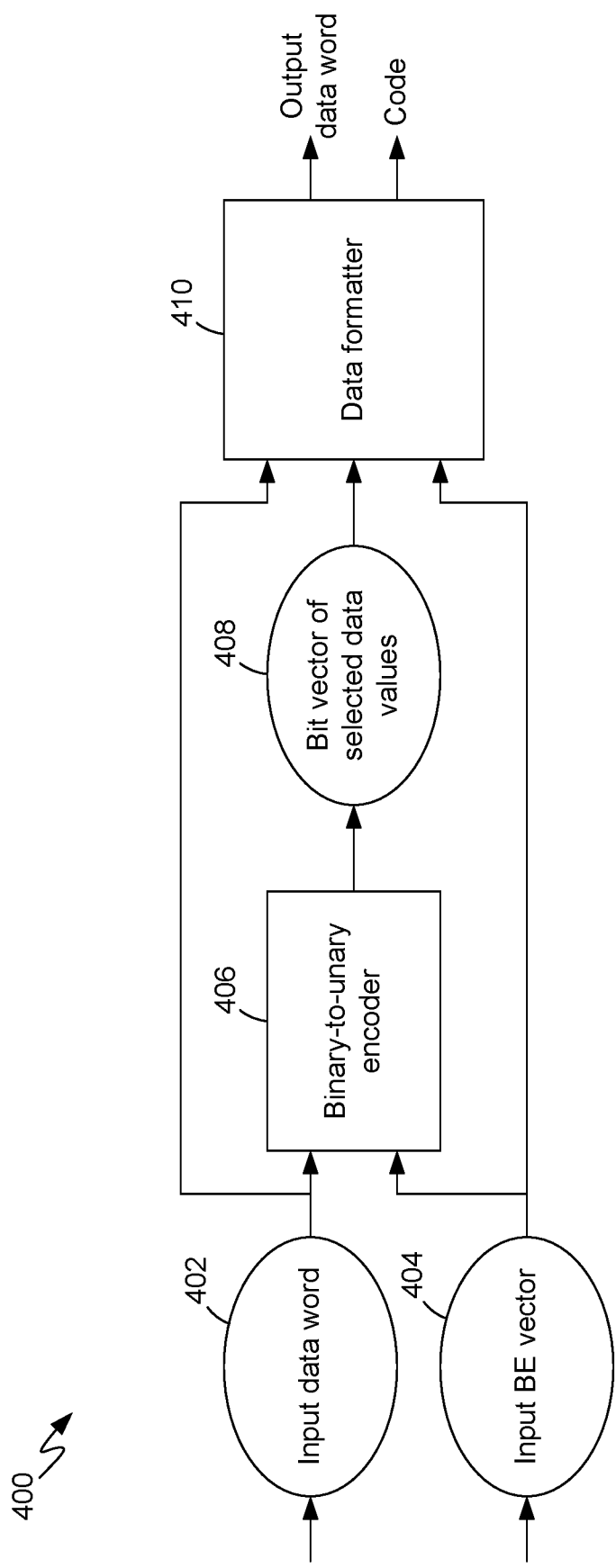
FIG. 4 is a block diagram illustrating a portion of a device configured to transmit or send data over a data bus, in accordance with exemplary embodiments.

As shown in FIG. 4, a system 400 may be configured to output a data word in which selected data values are positioned or contained in selected data bit groups, and the code is positioned or contained in non-selected data bit groups. The system 400 may be configured to output or provide the data word over a data bus (not shown in FIG. 4). The system 400 may be an example of a portion of the above-described sender device 102 (FIG. 1). The system 400 may comprise processor logic (e.g., programmed by software or firmware), discrete circuitry (e.g., finite state machines, combinational logic, etc.), or any combination thereof.

An input data word 402 may comprise the above-described set of selected data values, in positions (e.g., byte positions) corresponding to selected data bit groups (e.g., selected byte positions). Positions in the input data word 402 not corresponding to selected data bit groups, or stated conversely, corresponding to non-selected data bit groups, may contain any data values (i.e., logical "don't care" values). The input data word 402 may have a configuration similar to the above-described data word configuration 200 (FIG. 2). An input BE vector 404 may consist of an array or vector of bits, which indicates which data bit groups in the input data word 402 are selected and which data bit groups are not selected. The system 400 may maintain the input BE vector 404 in the form of a data structure, for example. In an example in which the receiver device 104 (FIG. 1) is a memory having a bus with a configurable data width, the input BE vector 404 may indicate (e.g., by '1' bits) the memory bus bytes that are selected (i.e., enabled) and may indicate (e.g., by '0' bits) the memory bus bytes that are not selected (i.e., not enabled).

A binary-to-unary encoder 406 may be configured to receive, obtain or otherwise determine the set of selected data values to be sent over the data bus. For example, the binary-to-unary encoder 406 may be configured to determine the input data word 402. Determining the input data word 402 may include receiving the input data word 402 from a data source, such as, for example, another portion (not shown) of the sender device. The binary-to-unary encoder 406 may similarly receive or otherwise determine the input BE vector 404. The binary-to-unary encoder 406, which may also be referred to as a 2's-complement encoder or converter, may also be configured to use the input BE vector 404 convert the input data word 402 into a bit vector of selected data values 408. As described below with regard to an example, the bit vector of selected data values 408 may contain a '1' bit in each bit position in which the bit position (i.e., the numerical index) is equal to a selected data value and may contain a '0' bit in each bit position in which the bit position (i.e., the numerical index) is not equal to a selected data value. As understood by one of ordinary skill in the art, the binary-to-unary encoder 406 may be implemented using straightforward configurations of logic gates, and conveniently provides the vectorized approach to indicating selected data values described herein. Nevertheless, the binary-to-unary encoder 406 is only one example of circuitry for determining a set of selected data values to be sent over the data bus, and other approaches and examples may occur to one of ordinary skill in the art in view of the descriptions herein.

The data word formatter 410 may be configured to receive the input data word 402, the input BE vector 404, and the bit vector of selected data values 408. The data word formatter 410 may further be configured to use the bit vector of selected data values 408 to determine a code representing a non-selected data value. For example, the data formatter 410 may be configured to select a bit position in the bit vector of selected data values 408 containing a '0' bit. If there are two or more bit positions containing '0' bits, the data formatter 410 may select any one of them.

The data formatter 410 may also be configured to determine the selected and non-selected bytes or other data bit groups. In the illustrated example, the data formatter 410 may use the input BE vector 404 to determine the selected and non-selected bytes.

The data word formatter 410 may further be configured to provide an output data word to a receiver device (e.g., over the data bit lanes 108 described above with regard to FIG. 1). The output data word may contain the selected data values in selected data bit groups and may contain the code in the non-selected data bit groups. For example, the data word formatter 410 may place the selected byte values indicated in the input data word 402 into corresponding byte positions of the output data word and may place the code into the remaining, non-selected byte positions of the output data word. The data word formatter 410 may also be configured to provide the code to the receiver device separately from the output data word (e.g., over the code bit lanes 110 described above with regard to FIG. 1).

Figure 5:
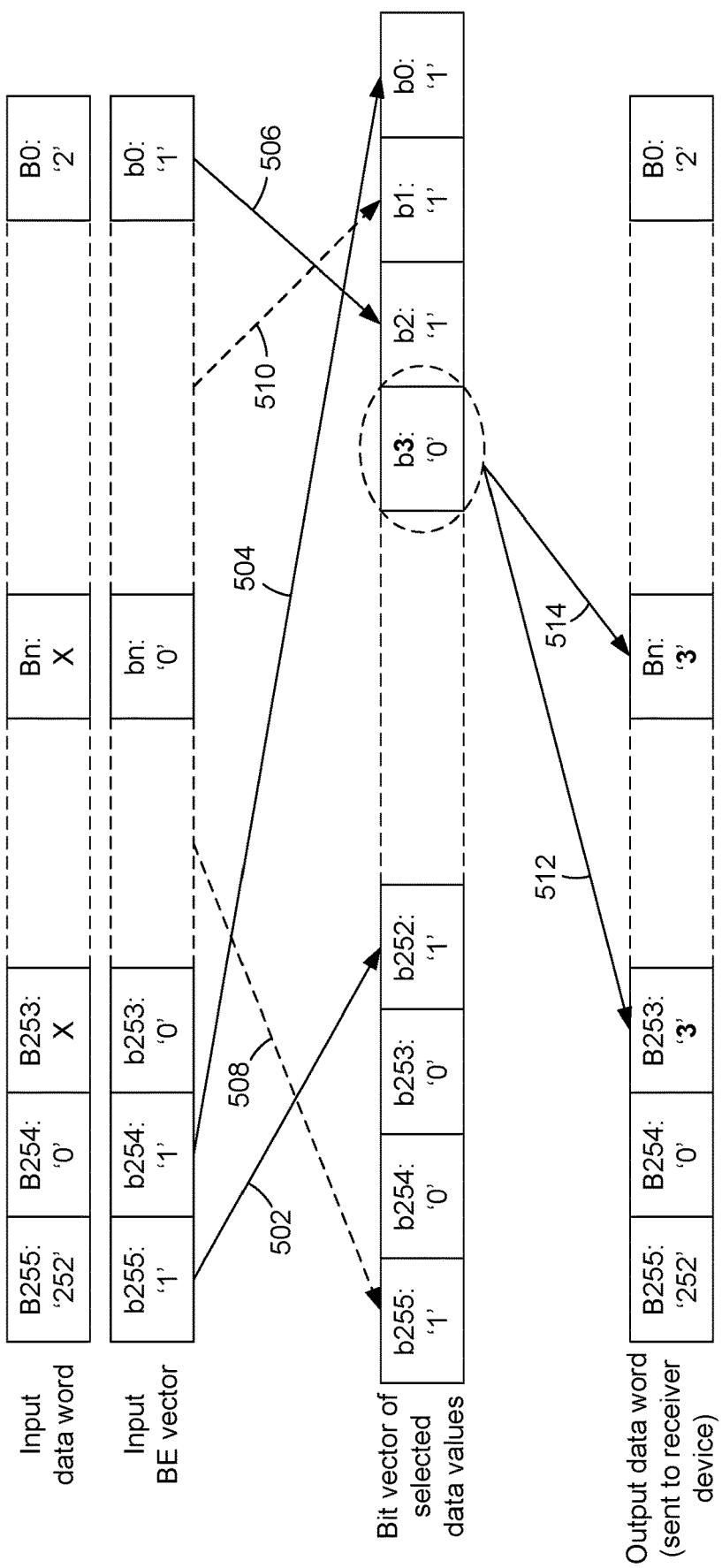
FIG. 5 is a data diagram illustrating an example of operation of the sender device of FIG. 4.

In FIG. 5, an example of operation of the above-described system 400 is shown. In the illustrated example, a 256-bit input BE vector includes, among other bit values (not all of which are shown for purposes of clarity): a '1' in bit position b255 (i.e., the most-significant bit position), thereby indicating that the corresponding data bus byte position B255 is selected; a '1' in bit position b254, thereby indicating that the corresponding data bus byte position B254 is selected; a '0' in bit position b253, thereby indicating that the corresponding data bus byte position B253 is not selected; and a '1' in bit position b0 (i.e., the least-significant bit position), thereby indicating that the corresponding data bus byte position B0 is selected. The exemplary BE vector may also include some other exemplary (or nth) bit position "bn" having a '0' and thereby indicating that the corresponding data bus byte position Bn is not selected. The bit values in bit positions b252 through b(n+1) and in bit positions b(n−1) through b1 are not shown for purposes of clarity but similarly may have values of '1' to indicate selected data bus byte positions or '0' to indicate non-selected data bus byte positions.

In the example illustrated in FIG. 5, a 256-byte input data word includes, among other data byte values (not all of which are shown for purposes of clarity): a data byte value of 252 in byte position B255 (i.e., the most-significant byte position); a data byte value of 0 in byte position B254; and a data byte value of 2 in byte position B0 (i.e., the least-significant byte position). The byte in byte position B253 may have any value, as indicated by the "don't care" symbol "X," because, as described above, the input BE vector in this example indicates that the data bus byte position B253 is not selected. Likewise, the byte in byte position Bn may have any value, as indicated by the "don't care" symbol "X," because, as described above, the input BE vector in this example indicates that the data bus byte position Bn is not selected. The data values in byte positions B252 through B(n+1) and in byte positions B(n−1) through B1 are not shown for purposes of clarity but may have any values. Note that as the data bit group in the illustrated example is one byte (i.e., eight bits), each byte value may be in a range from 0 to 255.

In forming the bit vector of selected data values in this example (FIG. 5), the binary-to-unary encoder 406 (FIG. 4) may place, among other bit values (not all of which are shown for purposes of clarity): a bit value of '1' in bit position b252, as indicated by an arrow 502, because the data byte in the selected data bus byte position B255 in the input data word has a value of 252; a bit value of '1' in bit position b0, as indicated by another arrow 504, because the data byte in the selected data bus byte position B254 in the input data word has a value of 0; and a bit value of '1' in bit position b2, as indicated by another arrow 506, because the data byte in the selected data bus byte position B0 in the input data word has a value of 2. Although data bytes in the input data word having data values of 255 and 1 are not explicitly shown, bit values are similarly set to '1' in bit positions b255 and b1 of the bit vector of selected data values in this example, as indicated by the broken-line arrows 508 and 510, respectively.

Note that the bit vector of selected data values indicates by the presence of a '1' in a bit position that a data value equal to that bit position (numerical index) is in the set of selected data values, i.e., is present in the input data word. For example, the '1' in bit position b255 indicates that a data value of 255 is present in the input data word, the '1' in bit position b252 indicates that a data value of 252 is present in the input data word, etc. Likewise, the bit vector of selected data values indicates by the presence of a '0' in a bit position that a data value equal to that bit position (numerical index) is not in the set of selected data values. For example, the '0' in bit position b254 indicates that a data value of 254 is not in the set of selected data values, the '0' in bit position b253 indicates that a data value of 253 is not in the set of selected data values, the '0' in bit position b3 indicates that a data value of 3 is not in the set of selected data values, etc.

In forming the output data word in this example (FIG. 5), the data formatter 410 (FIG. 4) first may determine a code representing an unused or non-selected data value. To determine a code, the data formatter 410 may determine which bit positions in the bit vector of selected data values have bit values of '0'. In the example illustrated in FIG. 5, the data formatter 410 may determine that the bit positions b254, b253, b3 (and perhaps other bits that are not shown) in the bit vector of selected data values have bit values of '0', and therefore, the data values of 254, 253 and 3 (and perhaps others that are not shown) are not in the set of selected data values. In this example, the data formatter 410 may select any of these unused data values, i.e., data values that are not in the set of selected data values, to serve as or represent the code. In the illustrated example, the data formatter 410 selects the unused data value 3. Nevertheless, the data formatter 410 could alternatively select the unused data value 253 or 254. A rule for selecting an unused data value in examples in which there are multiple unused data values may be implemented, such as selecting the data value corresponding to the bit position closest to the least-significant bit position.

In forming the output data word in this example (FIG. 5), the data formatter 410 may then place the code, which is 3 in this example, in each non-selected data bus byte position. Accordingly, the data formatter 410 may place a byte value of 3 in data bus byte positions B253 and Bn in this example, as indicated by the arrows 512 and 514, respectively. The data formatter 410 may similarly place a byte value of 3 in any other non-selected data bus byte positions (not shown for purposes of clarity). Although arrow indicators are not shown for purposes of clarity, the data formatter 410 may also place each selected data value, i.e., each data value that is present in the input word, in the same data bus byte position in the output data word in which that data value is present in the input data word. Accordingly, the data formatter 410 may place the data value 252 in data bus byte position B255 of the output data word, the data value 0 in data bus byte position B254 of the output data word, the data value 2 in data bus byte position B0 of the output data word, etc. The data formatter 410 may similarly place other data values (not shown for purposes of clarity) that may be present in the input data word in the corresponding data bus byte positions in the output data word. The data formatter 410 may use the input BE vector to determine which data bus byte positions are selected and which are non-selected.

Figure 6:
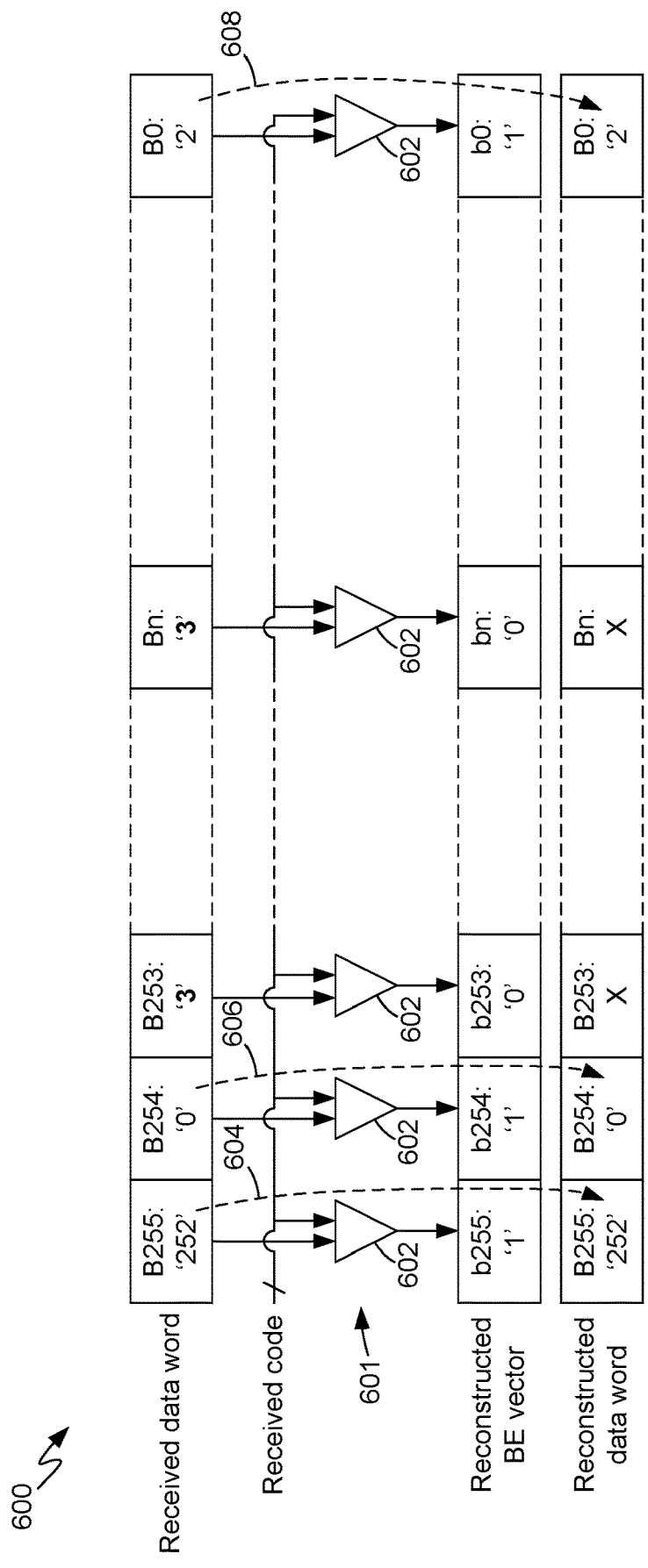
FIG. 6 is a block diagram illustrating a portion of a device configured to receive data over a data bus, in accordance with exemplary embodiments.

As shown in FIG. 6, a system 600 may be configured to receive a data word via a data bus (not shown). The data word may have the configuration of the output data word described above with regard to FIG. 5. That is, in the data word selected data values are positioned or contained in selected data bus byte positions, and the code is positioned or contained in non-selected data bus byte positions. The system 600 may be an example of a portion of the above-described receiver device 104 (FIG. 1). The system 600 may comprise processor logic (e.g., programmed by software or firmware), discrete circuitry (e.g., finite state machines, combinational logic, etc.), or any combination thereof.

The system 600 may include comparing logic 601. The comparing logic 601 may comprise a number of bit group (e.g., byte) comparators 602 equal to the number of data bus bit group (e.g., byte) positions. For example, a system 600 having 256 data bus byte positions may include 256 comparators 602 (not all of which are shown in FIG. 6 for purposes of clarity). Each comparator 602 may be configured to compare the data value received in one of the data bus byte positions with the code. The system 600 may be configured to reconstruct the BE vector. That is, the system 600 may form a reconstructed BE vector similar to the input BE vector described above with regard to FIG. 5. Once the system 600 forms a reconstructed BE vector, the system 600 or another portion of the receiver device 104 (FIG. 1) may use the reconstructed BE vector in a conventional manner to reconstruct or determine the data word.

If an output of one of the comparators 602 indicates a received data value matches the code, then the system 600 places a bit value of '0' in the corresponding bit position in the reconstructed BE vector. If an output of one of the comparators 602 indicates a received data value does not match the code, then the system 600 places a bit value of '1' in the corresponding bit position in the reconstructed BE vector. The comparators 602 (or other comparison logic in other embodiments) thus enable the system 600 to determine each non-selected data bus byte position, which is indicated by a received data value matching the code. Similarly, the comparators 602 enable the system 600 to determine each selected data bus byte position, which is indicated by a received data value not matching the code.

The system 600 or another portion of the receiver device 104, such as a processor or other processing logic (not shown), may then reconstruct or determine the data word. For example, the receiver device 104 may ignore or treat as a logical "don't care" any data value that is received in one of the data bus byte positions corresponding to a bit value of '0' in the corresponding bit position in the reconstructed BE vector. In other words, the reconstructed BE vector allows the receiver device 104 to determine which of the data bus byte positions are enabled, and thus which of the received data values are valid.

In an example in which the received data values are those of the output data word described above with regard to FIG. 5, reconstruction of the data word by the receiver device 104 may include the following. As the reconstructed byte enable vector indicates that the received data value 252 in data bus byte position B255 does not match the code (which is 3 is in this example), the received data value 252 is placed in the corresponding byte position in the reconstructed data word, as indicated by the arrow 604. Similarly, as the reconstructed byte enable vector indicates that the received data value 0 in data bus byte position B254 does not match the code, the received data value 0 is placed in the corresponding byte position in the reconstructed data word, as indicated by the arrow 606. However, as the reconstructed byte enable vector indicates that the received data value 3 in data bus byte position B253 matches the code, the byte position B253 in the reconstructed data word is invalid. Similarly, as the reconstructed byte enable vector indicates that the received data value 3 in data bus byte position Bn matches the code, the corresponding byte position Bn in the reconstructed data word is invalid. As the received data value 2 in data bus byte position B0 does not match the code, the received data value 2 is placed in the corresponding byte position in the reconstructed data word, as indicated by the arrow 608.

Once the receiver device 104 has reconstructed or determined the data word, the receiver device 104 may process all valid received data values in a conventional manner (and not process any invalid received data values). In an example in which the receiver device 104 is a memory device, the memory device may store the valid received data values (and not store any invalid received data values). Alternatively, or in addition, in some examples the receiver device 104 may place zeroes in invalid or non-selected byte positions before such processing.

Figure 7:
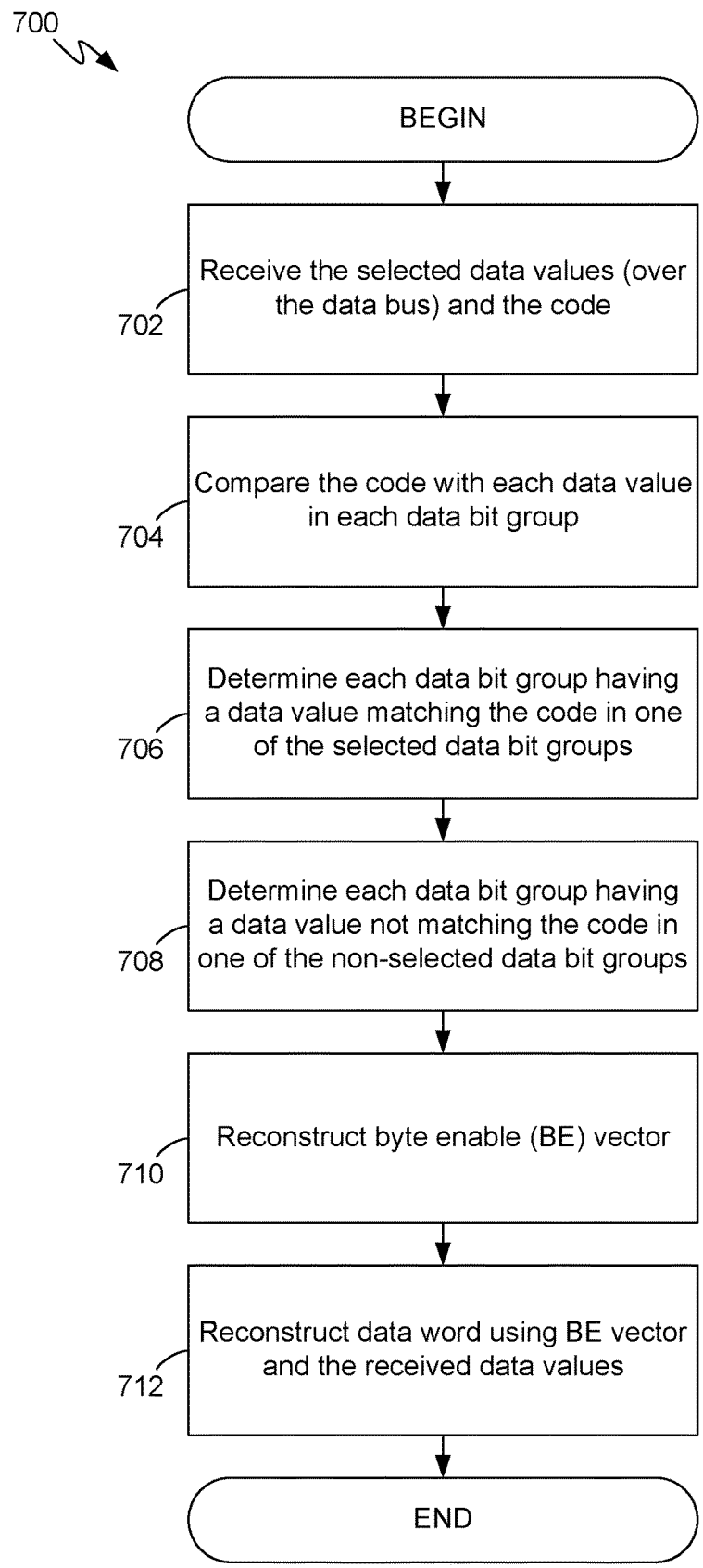
FIG. 7 is a flow diagram illustrating an exemplary method for receiving data over a data bus, in accordance with exemplary embodiments.

In FIG. 7, a method 700 for receiving data over a data bus is illustrated. A receiver device may be configured to control some or all of the method 700. For example, in an embodiment in which the receiver device includes a processor, the processor may be configured by software or firmware to control some or all of the method 700. Also, the receiver device or a portion thereof (e.g., a processor) may be an example of means for performing the functions set forth in the method 700. The method 700 may include the following features, functions, acts, etc., indicated by blocks 702-712, which may be performed or otherwise occur in any order not inconsistent with the descriptions herein. The blocks 702-712 are described in an order conducive to understanding the exemplary method 700, but methods for receiving data over a data bus are not limited to that order.

As indicated by block 702, the method 700 may include a receiver device receiving the selected data values over the data bus (data bit lanes) and the code over the code bit lanes. As indicated by block 704, the method 700 may include the receiver device comparing the code with each data value received in each data bus byte position (or other data bit group). As indicated by block 706, the method 700 may also include the receiver device determining or identifying each data bus byte position having a data value matching the code (i.e., identifying the selected data bus byte positions). Similarly, as indicated by block 708, the method 700 may include the receiver device determining or identifying each data bus byte position having a data value not matching the code (i.e., identifying the non-selected data bus byte positions).

As indicated by block 710, the method 700 may further include the receiver device reconstructing a byte enable vector. As indicated by block 712, the method 700 may still further include the receiver device using the reconstructed byte enable vector and the received data values to reconstruct the data word. In some examples, reconstructing the data word may include placing zeroes in invalid or non-selected byte positions.

Figure 8:
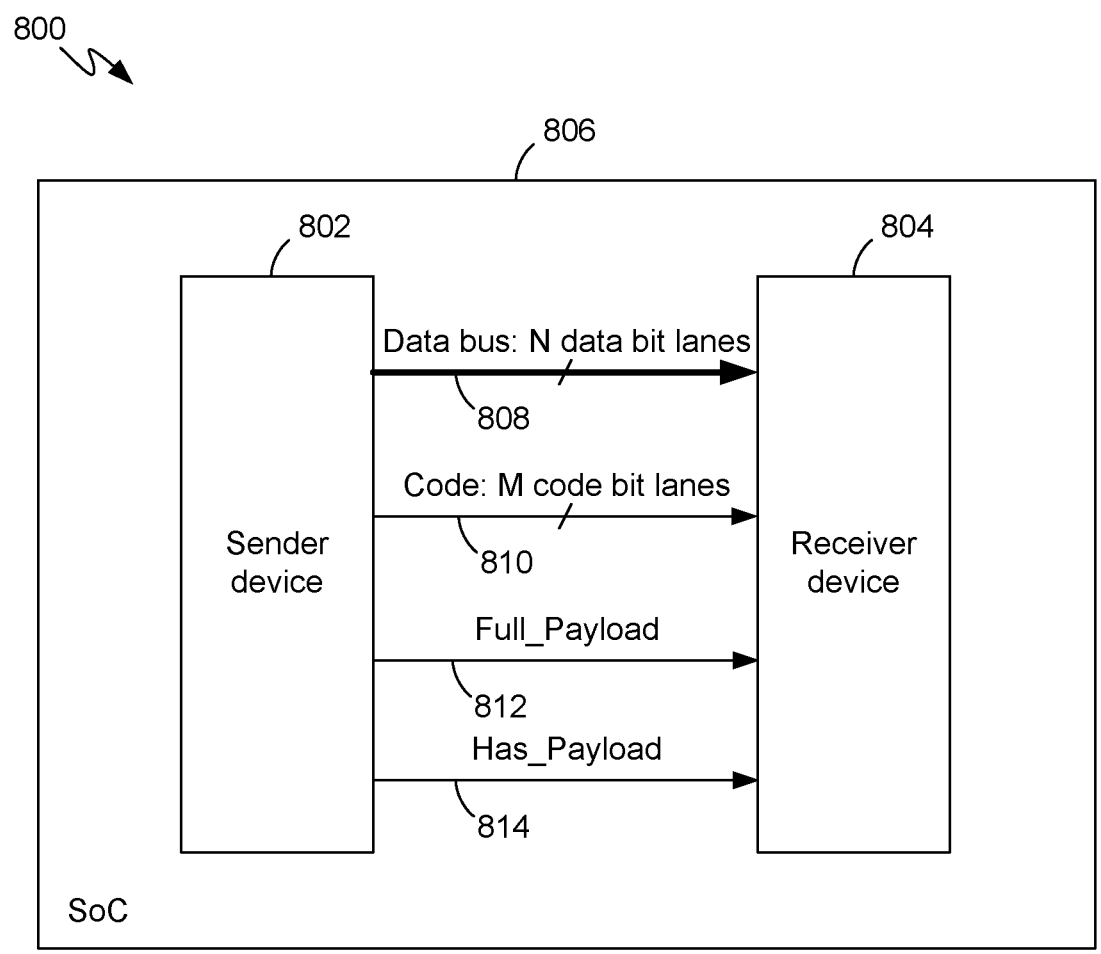
FIG. 8 is a block diagram illustrating another system for communicating data between a sender device and a receiver device over a data bus, in accordance with exemplary embodiments.

As shown in FIG. 8, a system 800 may include a sender device 802 and a receiver device 804 on an SoC 806. The system 800 may be similar to the above-described system 100 (FIG. 1) and may include N data bit lanes 808 and M code bit lanes 810 interconnecting the sender device 802 and receiver device 804. In addition, the system 800 may include a Full_Payload signal path 812 interconnecting the sender device 802 and receiver device 804. The sender device may assert a Full_Payload signal on the signal path 812 to indicate that all data bit groups are selected. For example, in an embodiment in which there are 2048 data bit lanes 808 (i.e., N=2048), and each of the selectable data bit groups is one byte, the sender device may assert the Full_Payload signal to indicate that all 256 data bus byte positions are selected. In response to detecting assertion of the Full_Payload signal, the receiver device 804 may forgo a portion of the above-described methods for reconstructing the data word and instead may consider the data value received in every data bus byte position as valid. In other words, when the receiver device 804 determines the Full_Payload signal is asserted, the receiver device 804 may process all of the data values received in all of the data bus byte positions.

Additionally, the system 800 may include a Has_Payload signal path 814 interconnecting the sender device 802 and receiver device 804. The sender device 802 may de-assert the Has_Payload signal on the signal path 814 when none of the data bus byte positions (or other data bit groups) are selected and may assert the Has_Payload signal when at least one data bus byte position (or other data bit group) is selected. De-assertion of the Has_Payload signal may indicate to the receiver device 804 not to expect to receive data.

Figure 9:
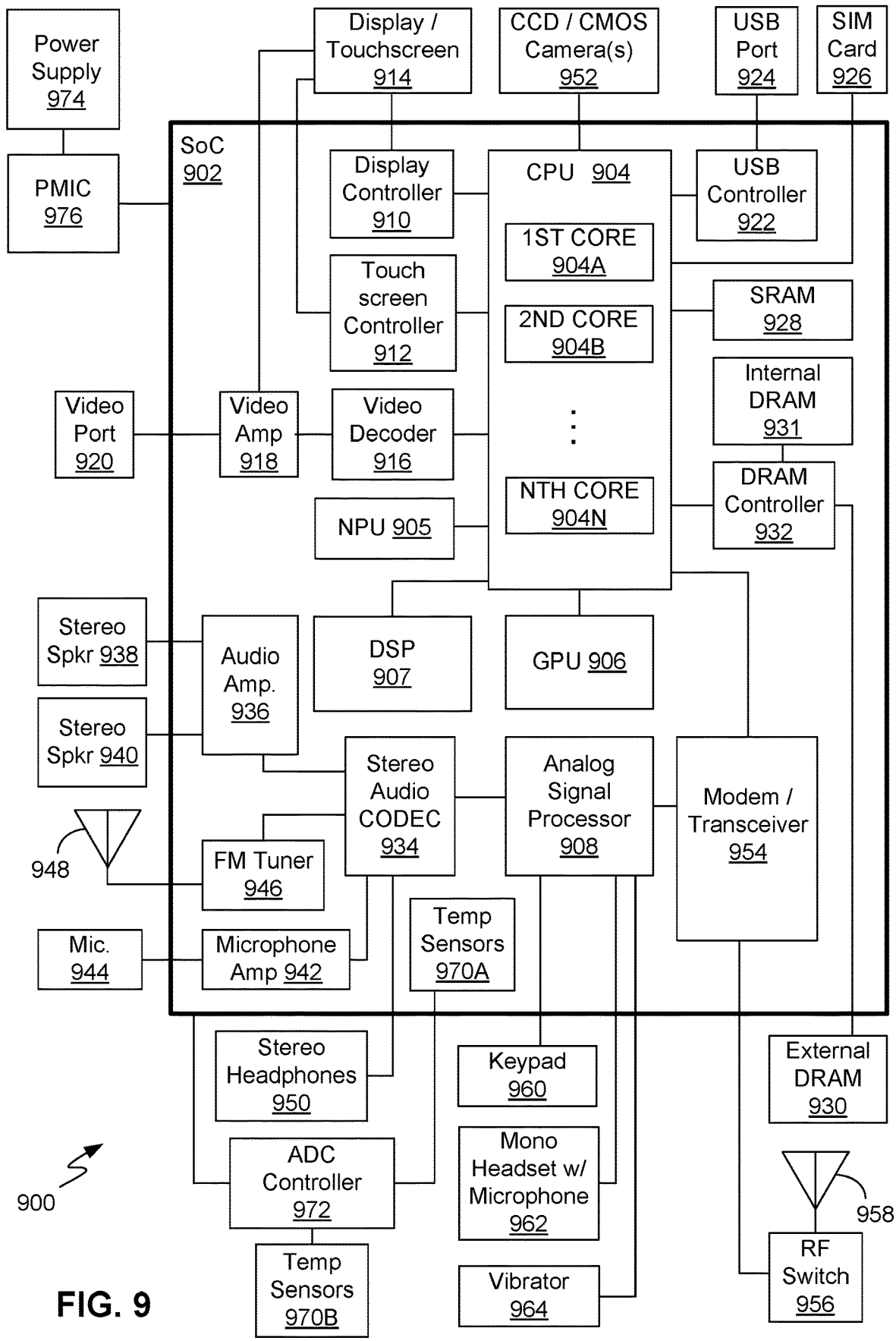
FIG. 9 is block diagram of a computing device, in accordance with exemplary embodiments.

FIG. 9 illustrates an example of a PCD 900, such as a mobile phone or smartphone, in which exemplary embodiments of systems, methods, computer-readable media, and other examples of communicating data over a data bus may be provided. For purposes of clarity, some data buses, interconnects, signals, etc., are not shown in FIG. 9. Although the PCD 900 is shown as an example, other embodiments of systems, methods, computer-readable media, and other examples of communicating data over a data bus may be provided in other types of computing devices or systems.

The PCD 900 may include an SoC 902. The SoC 902 may include a central processing unit ("CPU") 904, a neural processing unit ("NPU") 905, a graphics processing unit ("GPU") 906, a digital signal processor ("DSP") 907, an analog signal processor 908, a modem or transceiver subsystem 954, or other processors. The CPU 904 may include one or more CPU cores, such as a first CPU core 904A, a second CPU core 904B, etc., through an Nth CPU core 904N.

A display controller 910 and a touch-screen controller 912 may be coupled to the CPU 904. A touchscreen display 914 external to the SoC 902 may be coupled to the display controller 910 and the touch-screen controller 912. The PCD 900 may further include a video decoder 916 coupled to the CPU 904. A video amplifier 918 may be coupled to the video decoder 916 and the touchscreen display 914. A video port 920 may be coupled to the video amplifier 918. A universal serial bus ("USB") controller 922 may also be coupled to CPU 904, and a USB port 924 may be coupled to the USB controller 922. A subscriber identity module ("SIM") card 926 may also be coupled to the CPU 904.

One or more memories may be coupled to the CPU 904. The one or more memories may include both volatile and non-volatile memories. Examples of volatile memories include static random access memory ("SRAM") 928 and dynamic random access memory ("DRAM") 930 and 931. Such memories may be external to the SoC 902, such as the DRAM 930, or internal to the SoC 902, such as the DRAM 931. A DRAM controller 932 coupled to the CPU 904 may control the writing of data to, and reading of data from, the DRAMs 930 and 931.

Although not shown for purposes of clarity, a data bus coupling one or more of the memories 928, 930, 931, etc., and the CPU 904 or other processor (e.g., NPU 905, a GPU 906, a DSP 907, etc.) may be an example of the above described data bus 108 (FIG. 1) or 808 (FIG. 8). Any such processor or subsystem may be an example of the sender device 102 (FIG. 1) or 802 (FIG. 8), an example of the receiver device 104 (FIG. 1) or 804 (FIG. 8), or a combination of such a sender device and receiver device (i.e., a transceiver device). Any of the memories 928, 930, 931, etc., may be examples of the receiver device 104 (FIG. 1) or 804 (FIG. 8), in which the memory has a configurable width. Such processors or subsystems may accordingly have processing logic configured as described above with regard to FIGS. 3-7. A data bus or other interconnect (e.g., a NoC) coupling or interconnecting such a sender device and receiver device is not shown in FIG. 9 for purposes of clarity. Nevertheless, as understood by one of ordinary skill in the art, the SoC 902 may include any number of such data buses or other interconnects coupling or interconnecting various types of sender and receiver devices on the SoC 902. Other data buses may couple the SoC 902 with external devices, such as the external DRAM 930.

A stereo audio CODEC 934 may be coupled to the analog signal processor 908. Further, an audio amplifier 936 may be coupled to the stereo audio CODEC 934. First and second stereo speakers 938 and 940, respectively, may be coupled to the audio amplifier 936. In addition, a microphone amplifier 942 may be coupled to the stereo audio CODEC 934, and a microphone 944 may be coupled to the microphone amplifier 942. A frequency modulation ("FM") radio tuner 946 may be coupled to the stereo audio CODEC 934. An FM antenna 948 may be coupled to the FM radio tuner 946. Further, stereo headphones 950 may be coupled to the stereo audio CODEC 934. Other devices that may be coupled to the CPU 904 include one or more digital (e.g., CCD or CMOS) cameras 952.

The modem or RF transceiver 954 may be coupled to the analog signal processor 908 and the CPU 904. An RF switch

956 may be coupled to the RF transceiver 954 and an RF antenna 958. In addition, a keypad 960, a mono headset with a microphone 962, and a vibrator device 964 may be coupled to the analog signal processor 908.

The SoC 902 may have one or more internal or on-chip thermal sensors 970A and may be coupled to one or more external or off-chip thermal sensors 970B. An analog-to-digital converter controller 972 may convert voltage drops produced by the thermal sensors 970A and 970B to digital signals. A power supply 974 and a PMIC 976 may supply power to the SoC 902.

Firmware or software may be stored in any of the above-described memories, such as DRAM 930 or 931, SRAM 928, etc., or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

The solutions described above may reduce the number of data bit lanes on data buses. Reducing the number of data bit lanes may have an impact on reducing required area or footprint of the data buses on SoCs or in other systems, improving the timing of the data buses, reducing power consumption, etc.

Implementation examples are described in the following numbered clauses:

1. A method for data communication over a data bus having a plurality of data bit groups, each data bit group having a plurality of data bit lanes, the method comprising:
    determining, by a sender device, a set of selected data values to be sent over the data bus;
    determining, by the sender device, selected and non-selected data bit groups;
    determining, by the sender device, a code representing a non-selected data value not included in the set of selected data values;
    sending to a receiver device over the data bit lanes selected data values in selected data bit groups and the code in non-selected data bit groups; and
    sending the code to the receiver device separately from the data bit lanes.

2. The method of clause 1, wherein each data bit group consists of eight bits.

3. The method of clauses 1 or 2, wherein sending the code comprises sending the code over a plurality of code bit lanes separate from the data bit lanes.

4. The method of any of clauses 1-3, further comprising:
    determining, by the sender device, whether all data bit groups are selected; and
    sending an indication of all data bit groups being selected to the receiver device separately from the data bit lanes.

5. The method of any of clauses 1-4, further comprising:
    determining, by the sender device, whether no data bit group is selected; and
    sending an indication of no data bit group being selected to the receiver device separately from the data bit lanes.

6. The method of any of clauses 1-5, further comprising:
    receiving data values over the data bit lanes;
    receiving the code separately from the data bit lanes;
    comparing, by the receiver device, the code with each data value in each data bit group received over the data bit lanes;
    determining, by the receiver device, each data bit group having a data value matching the code in one of the selected data bit groups;
    determining, by the receiver device, each data bit group having a data value not matching the code in one of the non-selected data bit groups; and
    processing data values in the selected data bit groups while not processing data values in the non-selected data bit groups.

7. The method of any of clauses 1-6, wherein sending the selected data values to the receiver device over the data bit lanes, sending the code to the receiver device, receiving the selected data values over the data bit lanes, and receiving the code are all performed in a system-on-a-chip ("SoC").

8. A system for data communication over a data bus having a plurality of data bit groups, each data bit group having a plurality of data bit lanes, the system comprising:
    an encoder configured to determine a set of selected data values to be sent over the data bus in selected data bit groups; and
    a data word formatter configured to determine selected and non-selected data bit groups, to determine a code representing a non-selected data value not included in the set of selected data values, to provide to a receiver device over the data bit lanes a data word having the selected data values in the selected data bit groups and the code in non-selected data bit groups, and to provide the code to the receiver device over a plurality of code bit lanes separate from the data bit lanes.

9. The system of clause 8, wherein the encoder comprises a binary-to-unary encoder configured to determine a bit vector having a plurality of bit positions corresponding to the selected data values.

10. The system of clauses 8 or 9, wherein each data bit group consists of eight bits.

11. The system of any of clauses 8-10, wherein the data word formatter is further configured to determine whether all data bit groups are selected and to provide a signal to the receiver device over a signal lane indicating all data bit groups are selected.

12. The system of any of clauses 8-11, wherein the data word formatter is further configured to determine whether no data bit group is selected and to provide a signal to the receiver device over a signal lane indicating no data bit group is selected.

13. The system of any of clauses 8-12, further comprising a receiver device coupled to the plurality of data bit lanes and plurality of code bit lanes.

14. The system of any of clauses 8-13, wherein the receiver device comprises a memory device having a configurable data width.

15. The system of any of clauses 8-14, wherein the receiver device is configured to:
    receive data values over the data bit lanes;
    receive the code over the code bit lanes;
    compare the code with each data value in each data bit group received over the data bus;
    determine each data bit group having a data value matching the code in one of the selected data bit groups; and
    determine each data bit group having a data value not matching the code in one of the non-selected data bit groups.

16. The system of any of clauses 8-15, wherein the system for data communication and the data bus are included in a system-on-a-chip ("SoC").

17. A system for data communication over a data bus having a plurality of data bit groups, each data bit group having a plurality of data bit lanes, the system comprising:
- means for determining, by a sender device, a set of selected data values to be sent over the data bus;
- means for determining, by the sender device, selected and non-selected data bit groups;
- means for determining, by the sender device, a code representing a non-selected data value not included in the set of selected data values;
- means for sending to a receiver device over the data bit lanes selected data values in selected data bit groups and the code in non-selected data bit groups; and
- means for sending the code to the receiver device separately from the data bit lanes.

18. The system of clause 17, wherein each data bit group consists of eight bits.

19. The system of clauses 17 or 18, wherein the means for sending the code comprises means for sending the code over a plurality of code bit lanes separate from the data bit lanes.

20. The system of any of clauses 17-19, wherein the receiver device comprises a memory device having a configurable width.

21. The system of any of clauses 17-20, further comprising:
- means for determining, by the sender device, whether all data bit groups are selected; and
- means for sending an indication of all data bit groups being selected to the receiver device separately from the data bit lanes.

22. The system of any of clauses 17-21, further comprising:
- means for determining, by the sender device, whether no data bit group is selected; and
- means for sending an indication of no data bit group being selected to the receiver device separately from the data bit lanes.

23. The system of any of clauses 17-22, further comprising:
- means for receiving data values over the data bit lanes;
- means for receiving the code separately from the data bit lanes;
- means for comparing, by the receiver device, the code with each data value in each data bit group received over the data bit lanes;
- means for determining, by the receiver device, each data bit group having a data value matching the code in one of the selected data bit groups;
- means for determining, by the receiver device, each data bit group having a data value not matching the code in one of the non-selected data bit groups; and
- means for processing data values in the selected data bit groups while not processing data values in the non-selected data bit groups.

24. A computer-readable medium for data communication over a data bus having a plurality of data bit groups, each data bit group having a plurality of data bit lanes, the computer-readable medium comprising a non-transitory computer-readable medium having instructions stored thereon in computer-executable form, the instructions when executed by a processing system of a computing device configuring the processing system to control:
- determining a set of selected data values to be sent over the data bus;
- determining selected and non-selected data bit groups;
- determining a code representing a non-selected data value not included in the set of selected data values;
- sending to a receiver device over the data bit lanes selected data values in selected data bit groups and the code in non-selected data bit groups; and
- sending the code to the receiver device separately from the data bit lanes.

25. The computer-readable medium of clause 24, wherein each data bit group consists of eight bits.

26. The computer-readable medium of clauses 24 or 25, wherein sending the code comprises sending the code over a plurality of code bit lanes separate from the data bit lanes.

27. The computer-readable medium of any of clauses 24-26, further comprising instructions configuring the processing system to control:
- determining whether all data bit groups are selected; and
- sending an indication of all data bit groups being selected to the receiver device separately from the data bit lanes.

28. The computer-readable medium of any of clauses 24-27, further comprising instructions configuring the processing system to control:
- determining, by the sender device, whether no data bit group is selected; and
- sending an indication of no data bit group being selected to the receiver device separately from the data bit lanes.

29. A method for data communication over a data bus having a plurality of data bit groups, each data bit group having a plurality of data bit lanes, the method comprising:
- receiving, by a receiver device, a code separately from the data bit lanes;
- receiving, by the receiver device, data values over the data bit lanes of the data bus;
- comparing, by the receiver device, the code with each data value in each data bit group received over the data bus;
- determining, by the receiver device, each data bit group having a data value matching the code;
- determining, by the receiver device, each data bit group having a data value not matching the code; and
- providing indications of selected data bit groups based on determinations of data bit groups having data values matching the code and indications of non-selected data bit groups based on determinations of data bit groups having data values not matching the code.

30. The method of clause 29, further comprising processing data values in the selected data bit groups while not processing data values in the non-selected data bit groups.

31. A system for data communication over a data bus having a plurality of data bit groups, each data bit group having a plurality of data bit lanes, the system comprising:
- comparing logic configured to receive the selected data values over the data bit lanes, to receive the code separately from the data bit lanes, to compare the code with each data value in each data bit group, to determine each data bit group having a data value matching the code in one of the selected data bit groups, and to determine each data bit group having a data value not matching the code in one of the non-selected data bit groups; and
- processing logic configured to provide indications of selected data bit groups based on determinations of data bit groups having data values matching the code and indications of non-selected data bit groups based on determinations of data bit groups having data values not matching the code.

32. The system of clause 31, wherein the processing logic is configured to process data values in the selected data bit groups and not process data values in the non-selected data bit groups.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for data communication over a data bus having a plurality of data bit groups, each data bit group having a plurality of data bit lanes, the method comprising:
   determining, by an encoder of a sender device, a set of selected data values to be sent over the data bus, the encoder receiving a byte enable vector and an input data word, and the encoder using the byte enable vector to convert the input data word into a bit vector, the bit vector having a plurality of bit positions corresponding to the set of selected data values to be sent over the data bus;
   determining, by a data word formatter of the sender device, selected and non-selected data bit groups, the data word formatter receiving the bit vector from the encoder;
   determining from the bit vector, by the data word formatter of the sender device, a code representing a non-selected data value not included in the set of selected data values, the data word formatter generating an output data word;
   sending the output data word from the data word formatter to a receiver device over the data bit lanes, the output data word having selected data values in selected data bit groups and the code in non-selected data bit groups; and
   sending the code from the data word formatter to the receiver device separately from the data bit lanes using code bit lanes.

2. The method of claim 1, wherein each data bit group consists of eight bits.

3. The method of claim 1, further comprising:
   determining, by the sender device, whether all data bit groups are selected; and
   sending an indication of all data bit groups being selected to the receiver device separately from the data bit lanes.

4. The method of claim 1, further comprising:
   determining, by the sender device, whether no data bit group is selected; and
   sending an indication of no data bit group being selected to the receiver device separately from the data bit lanes.

5. The method of claim 1, further comprising:
   receiving the output data word having data values over the data bit lanes;
   receiving the code separately from the data bit lanes on the code bit lanes;
   comparing, by the receiver device, the code with each data value in each data bit group received over the data bit lanes;
   determining, by the receiver device, each data bit group having a data value matching the code in one of the selected data bit groups;
   determining, by the receiver device, each data bit group having a data value not matching the code in one of the non-selected data bit groups; and
   processing data values in the selected data bit groups while not processing data values in the non-selected data bit groups.

6. The method of claim 5, wherein sending the selected data values to the receiver device over the data bit lanes, sending the code to the receiver device, receiving the selected data values over the data bit lanes, and receiving the code are all performed in a system-on-a-chip ("SoC").

7. A system for data communication over a data bus having a plurality of data bit groups, each data bit group having a plurality of data bit lanes, the system comprising:
   an encoder receiving a byte enable vector and an input data word, and the encoder configured to determine a set of selected data values to be sent over the data bus in selected data bit groups by using the byte enable vector to convert the input data word into a bit vector, the bit vector having a plurality of bit positions corresponding to the set of selected data values; and
   a data word formatter receiving the bit vector from the encoder and configured to determine selected and non-selected data bit groups, to determine a code from the bit vector, the code representing a non-selected data value not included in the set of selected data values, to provide to a receiver device over the data bit lanes an output data word having the selected data values in the selected data bit groups and the code in non-selected data bit groups, and to provide the code to the receiver device over a plurality of code bit lanes separate from the data bit lanes.

8. The system of claim 7, wherein each data bit group consists of eight bits.

9. The system of claim 7, wherein the data word formatter is further configured to determine whether all data bit groups are selected and to provide a signal to the receiver device over a signal lane indicating all data bit groups are selected.

10. The system of claim 7, wherein the data word formatter is further configured to determine whether no data bit group is selected and to provide a signal to the receiver device over a signal lane indicating no data bit group is selected.

11. The system of claim 7, further comprising a receiver device coupled to the plurality of data bit lanes and plurality of code bit lanes.

12. The system of claim 11, wherein the receiver device comprises a memory device having a configurable data width.

13. The system of claim 11, wherein the receiver device is configured to:
   receive the output data word having data values over the data bit lanes;
   receive the code over the code bit lanes;
   compare the code with each data value in each data bit group received over the data bus;
   determine each data bit group having a data value matching the code in one of the selected data bit groups; and
   determine each data bit group having a data value not matching the code in one of the non-selected data bit groups.

14. The system of claim 7, wherein the system for data communication and the data bus are included in a system-on-a-chip ("SoC").

15. A computer-readable medium for data communication over a data bus having a plurality of data bit groups, each data bit group having a plurality of data bit lanes, the computer-readable medium comprising a non-transitory computer-readable medium having instructions stored thereon in computer-executable form, the instructions when executed by a processing system of a computing device configuring the processing system to control:
   determining with an encoder a set of selected data values to be sent over the data bus, the encoder receiving a byte enable vector and an input data word, and the encoder using the byte enable vector to convert the input data word into a bit vector, the bit vector having a plurality of bit positions corresponding to the set of selected data values;

determining with a data word formatter selected and non-selected data bit groups, the data word formatter receiving the bit vector from the encoder;

determining with the data word formatter a code from the bit vector representing a non-selected data value not included in the set of selected data values, the data word formatter generating an output data word;

sending the output data word from the data word formatter to a receiver device over the data bit lanes, the output data word having selected data values in selected data bit groups and the code in non-selected data bit groups; and sending the code from the data word formatter to the receiver device separately from the data bit lanes using code bit lanes.

16. The computer-readable medium of claim 15, wherein each data bit group consists of eight bits.

17. The computer-readable medium of claim 15, further comprising instructions configuring the processing system to control:

determining whether all data bit groups are selected; and sending an indication of all data bit groups being selected to the receiver device separately from the data bit lanes.

18. The computer-readable medium of claim 15, further comprising instructions configuring the processing system to control:

determining, by the sender device, whether no data bit group is selected; and sending an indication of no data bit group being selected to the receiver device separately from the data bit lanes.

19. A method for data communication over a data bus having a plurality of data bit groups, each data bit group having a plurality of data bit lanes, the method comprising:

receiving, by a receiver device, a code separately from the data bit lanes over code bit lanes;

receiving, by the receiver device, a first data word having data values over the data bit lanes of the data bus;

comparing, by comparators in the receiver device, the code with the first data word having each data value in each data bit group received over the data bus;

determining, by the receiver device, each data bit group having a data value matching the code;

determining, by the receiver device, each data bit group having a data value not matching the code;

generating a byte enable vector from the first data word and code with the receiver device, the byte enable vector comprising indications of selected data bit groups based on determinations of data bit groups having data values matching the code and indications of non-selected data bit groups based on determinations of data bit groups having data values not matching the code; and reconstructing a second data word based on the byte enable vector.

20. The method of claim 19, further comprising processing data values in the selected data bit groups while not processing data values in the non-selected data bit groups.

21. A system for data communication over a data bus having a plurality of data bit groups, each data bit group having a plurality of data bit lanes, the system comprising:

comparing logic configured to receive a first data word having selected data values over the data bit lanes, to receive the code separately from the data bit lanes over code bit lanes, to compare the code with each data value in each data bit group, to determine each data bit group having a data value matching the code, and to determine each data bit group having a data value not matching the code;

processing logic configured to generate a byte enable vector from the code and first data word comprising indications of selected data bit groups based on determinations of data bit groups having data values matching the code and indications of non-selected data bit groups based on determinations of data bit groups having data values not matching the code; and processing logic configured to reconstruct a second data word based on the byte enable vector.

22. The system of claim 21, wherein the processing logic is configured to process data values in the selected data bit groups and not process data values in the non-selected data bit groups.

* * * * *